(12) United States Patent
Son et al.

(10) Patent No.: US 10,778,549 B2
(45) Date of Patent: Sep. 15, 2020

(54) APPARATUS AND METHOD FOR VALIDATING SERVICE CONTROL STATUS

(71) Applicant: ELECTRONICS AND TELECOMMUNICATIONS RESEARCH INSTITUTE, Daejeon (KR)

(72) Inventors: Seok-Ho Son, Daejeon (KR); Dong-Jae Kang, Daejeon (KR); Byoung-Seob Kim, Sejong (KR); Sun-Wook Kim, Hwaseong (KR); Myeong-Hoon Oh, Daejeon (KR); Byeong-Thaek Oh, Sejong (KR); Young-Woo Jung, Daejeon (KR); Hyun-Hwa Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 237 days.

(21) Appl. No.: 15/803,620

(22) Filed: Nov. 3, 2017

(65) Prior Publication Data

US 2018/0254965 A1 Sep. 6, 2018

(30) Foreign Application Priority Data

Mar. 6, 2017 (KR) .......................... 10-2017-0028363

(51) Int. Cl.
*H04L 29/08* (2006.01)
*H04L 12/26* (2006.01)
(Continued)

(52) U.S. Cl.
CPC ...... *H04L 43/0817* (2013.01); *H04L 41/5067* (2013.01); *H04L 67/16* (2013.01);
(Continued)

(58) Field of Classification Search
CPC ... H04L 43/0817; H04L 67/16; H04L 5/0055; H04L 41/12; H04L 67/10
See application file for complete search history.

(56) References Cited

U.S. PATENT DOCUMENTS 8,315,373 B1 * 11/2012 Flockhart ............ H04M 3/5234
379/265.01
8,713,163 B2 * 4/2014 Teather ............... H04L 41/5009
709/203
(Continued)

FOREIGN PATENT DOCUMENTS

JP 2015200986 A 11/2015
KR 10-2013-0084796 A 7/2013
(Continued)

*Primary Examiner* — Viet D Vu

(57) ABSTRACT

Disclosed herein are apparatus and method for validating service control status. The apparatus for validating service control status includes a service control request unit for requesting control of a service from a computing system, a service control status checking period generation unit for generating a service control status checking period in order to check completion of the service control, and a service control status checking communication unit for performing service control status checking communication with the computing system based on the service control status checking period.

20 Claims, 10 Drawing Sheets

(51) Int. Cl.
*H04L 12/24* (2006.01)
*H04L 5/00* (2006.01)

(52) U.S. Cl.
CPC ............ *H04L 5/0055* (2013.01); *H04L 41/12* (2013.01); *H04L 41/5009* (2013.01); *H04L 67/10* (2013.01)

(56) References Cited

U.S. PATENT DOCUMENTS

| | | |
|---|---|---|
| 9,356,958 B2 | 5/2016 | Jeon et al. |
| 2012/0072579 A1* | 3/2012 | Teather ............... H04L 41/5009 709/224 |
| 2015/0140990 A1 | 5/2015 | Kim et al. |
| 2016/0269308 A1 | 9/2016 | Lee et al. |
| 2016/0294643 A1 | 10/2016 | Kim |
| 2016/0308851 A1 | 10/2016 | Tiwari |
| 2018/0074864 A1* | 3/2018 | Chen ..................... G06F 9/5022 |
| 2018/0196696 A1* | 7/2018 | Kairali ................. G06F 9/5077 |

FOREIGN PATENT DOCUMENTS

| | | |
|---|---|---|
| KR | 20140099109 A | 8/2014 |
| KR | 10-1480905 B1 | 1/2015 |
| KR | 10-2015-0059081 A | 5/2015 |

\* cited by examiner

FIG. 5

| TIME | 0 | 1 | 2 | 3 | 4 | 5 | ... | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|
| EVENT | CONTROL REQUEST | CONTROL REQUEST ACK | | | | | | | | | | | | | | | CONTROL COMPLETION CHECKING | | | | VERIFICATION TIME LIMIT | |
| NUMBER OF CHECKS | | 10 | 10 | 10 | 10 | 10 | ... | 10 | 10 | 10 | 10 | 10 | 10 | 10 | 10 | 10 | 0 | 0 | 0 | 0 | 0 | |

FIG. 6

| TIME (t) | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| EVENT | CONTROL REQUEST | CONTROL REQUEST ACK | | | | | | | | | | | | PREDICTED COMPLETION TIME | | | | | | | VERIFICATION TIME LIMIT | |
| NUMBER OF CHECKS | | | r1,2 | r2,3 | ... | ... | ... | r7,8 | r8,9 | r9, 10 | r10, 11 | r11, 12 | r12, 13 | r13, 14 | r14, 15 | r15, 16 | r16, 15 | r17, 18 | r18, 19 | r19, 20 | 0 | |

FIG. 7

| TIME | 0 | 1 | 2 | 3 | 4 | 5 | ... | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|
| EVENT | CONTROL REQUEST | CONTROL REQUEST ACK | | | | | | | | | | | | PREDICTED COMPLETION TIME | | | | | | | VERIFICATION TIME LIMIT | |
| NUMBER OF CHECKS | | 1 | 1 | 1 | 1 | 1 | ... | 1 | 2 | 3 | 5 | 10 | 20 | 40 | 20 | 10 | 5 | 3 | 2 | 1 | 0 | | ically, to technology for checking and verifying service control for multi-cloud computing interoperation.

APPARATUS AND METHOD FOR VALIDATING SERVICE CONTROL STATUS

CROSS REFERENCE TO RELATED APPLICATION

This application claims the benefit of Korean Patent Application No. 10-2017-0028363, filed Mar. 6, 2017, which is hereby incorporated by reference in its entirety into this application.

BACKGROUND OF THE INVENTION

1. Technical Field

The present invention relates generally to multi-cloud computing technology and, more particularly, to technology for checking and verifying service control for multi-cloud computing interoperation.

This work supported by 'The Cross-Ministry Giga Korea Project' grant funded by the Korea government (MSIT) (No. GK17P0100, Development of Tele-Experience Service SW Platform Based on Giga Media).

2. Description of the Related Art

A cloud interoperation and management system that supports a multi-cloud environment may communicate with a cloud computing system and may request service control (e.g. creation, stoppage, resumption, termination, etc. of a service), in place of a user, in order to provide and manage a cloud service requested by the user.

When a cloud interoperation system requests service control from a cloud computing system, the cloud interoperation system may control the corresponding service. Further, the cloud computing system may notify (acknowledge: ACK) the cloud interoperation system of an acceptance of the request for service control by sending an ACK message to the cloud interoperation system. However, since it is impossible for the cloud interoperation system to guarantee that the service control has actually been completed at the time of notification (ACK), there is a need to check that service control has been completed. A conventional cloud interoperation system continuously performs checking communication with the cloud computing system at regular intervals of a predetermined checking period in order to verify whether service control has been completed.

The conventional technology continuously checks the time point of completion of service control by the cloud computing system. Here, if the checking period is set to a short period, a high communication load may be incurred. In contrast, if the checking period is set to a long period, the Quality of Experience (QoE) of the user may be deteriorated because the update of service status is delayed. Moreover, the conventional technology is problematic in that checking communication is performed even at a time point at which there is a very low probability of service control being completed, thus unnecessarily wasting system resources. Since the cloud interoperation system may be interoperably connected to multiple cloud computing systems and may provide services to many users, a fatally high load may be incurred.

Therefore, there is a need to decrease a system load and increase user convenience by suitably adjusting the period at which service control is to be checked.

Meanwhile, Korean Patent Application Publication No. 10-2013-0084796 entitled "Apparatus and Method for Guaranteeing Computing Resource in Cloud Computing Environment for Cloud Customer" discloses an apparatus and method for verifying whether requested computing resources have been allocated to virtual machines provided to a user in a cloud environment.

However, the technology disclosed in Korean Patent Application Publication No. 10-2013-0084796 does not check the time point of control completion, and thus a high load related to whether resources are to be allocated may be incurred when multiple cloud computing systems interoperate with each other.

SUMMARY OF THE INVENTION

Accordingly, the present invention has been made keeping in mind the above problems occurring in the prior art, and an object of the present invention is to decrease the communication load on a cloud interoperation system and multiple cloud computing systems interoperably connected thereto and to improve the speed at which service control is checked.

Another object of the present invention is to improve the user response speed and Quality of Experience (QoE) of a cloud interoperation system and multiple cloud computing systems interoperably connected thereto.

A further object of the present invention is to predict the accurate time of completion of service control and a precise checking period for completion of service control using a statistical prediction technique.

In accordance with an aspect of the present invention to accomplish the above objects, there is provided an apparatus for validating service control status, including a service control request unit for requesting control of a service from a computing system; a service control status checking period generation unit for generating a service control status checking period in order to check completion of the service control; and a service control status checking communication unit for performing service control status checking communication with the computing system based on the service control status checking period.

The apparatus may further include a service status update unit for updating a status of service control.

The service control status checking period generation unit may generate the service control status checking period by predicting a service control completion time.

The service control status checking period generation unit may store history information in which service control completion times depending on control request transactions for respective service types are included.

The service control status checking period generation unit may predict service control completion times depending on the service types using the history information.

The service control status checking period generation unit may calculate a moving average and a moving variance of service control completion times for m (where m is a natural number of 2 or more) control request transaction sections using the history information.

The service control status checking period generation unit may calculate a probability distribution of the service control completion times from a normal probability distribution obtained by defining the moving average as an expected value of the normal probability distribution and defining the moving variance as a variance of the normal probability distribution.

The service control status checking period generation unit may divide a total verification time required to check completion of the service control into units of preset time intervals, and generate a service control status checking period using the probability distribution for each of the time interval units.

The service control status checking period generation unit may calculate a number of service control completion checks by integrating the probability distribution over each of the preset time intervals.

The service control status checking period generation unit may correct the number of service control completion checks using a preset reference constant such that the number does not exceed a maximum response time of the computing system.

The service control status checking period generation unit may correct the number of service control completion checks using a weight in which a frequency of checking communication with the computing system is set.

The service control status checking period generation unit may calculate a value, obtained by dividing the corresponding preset time interval unit by the number of service control completion checks, as the service control status checking period.

In accordance with another aspect of the present invention to accomplish the above objects, there is provided a method for validating service control status, including requesting control of a service from a computing system; generating a service control status checking period in order to check completion of the service control; and performing service control status checking communication with the computing system based on the service control status checking period.

Generating the service control status checking period may be configured to generate the service control status checking period by predicting a service control completion time.

Generating the service control status checking period may be configured to predict service control completion times depending on the service types using history information in which service control completion times depending on control request transactions for respective service types are stored.

Generating the service control status checking period may be configured to calculate a moving average and a moving variance of service control completion times for m (where m is a natural number of 2 or more) control request transaction sections using the history information.

Generating the service control status checking period may be configured to calculate a probability distribution of the service control completion times from a normal probability distribution obtained by defining the moving average as an expected value of the normal probability distribution and defining the moving variance as a variance of the normal probability distribution.

Generating the service control status checking period may be configured to divide a total verification time required to check completion of the service control into units of preset time intervals, and generate a service control status checking period using the probability distribution for each of the time interval units.

Generating the service control status checking period may be configured to calculate a number of service control completion checks by integrating the probability distribution over each of the preset time intervals.

Generating the service control status checking period may be configured to calculate a value, obtained by dividing the corresponding preset time interval unit by the number of service control completion checks, as the service control status checking period.

BRIEF DESCRIPTION OF THE DRAWINGS

The above and other objects, features and advantages of the present invention will be more clearly understood from the following detailed description taken in conjunction with the accompanying drawings, in which:

FIG. 5 is a diagram illustrating the period at which the completion of service control is to be checked based on a fixed period according to an embodiment of the present invention;

FIGS. 6 and 7 are diagrams illustrating the period at which the completion of service control is to be checked based on probability statistics according to an embodiment of the present invention;

DESCRIPTION OF THE PREFERRED EMBODIMENTS

Figure 1:
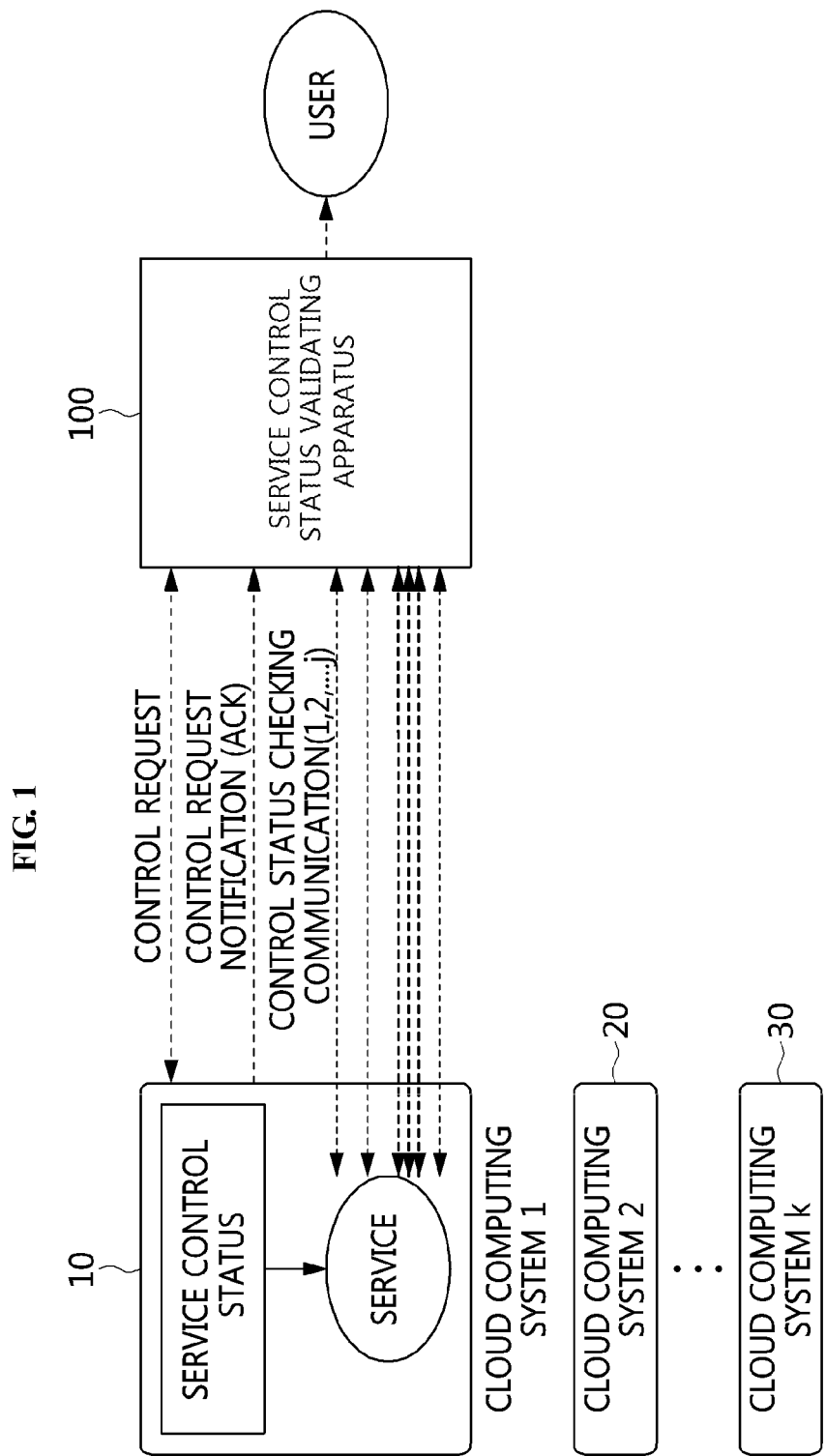
FIG. 1 is a block diagram illustrating a cloud interoperation system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Hereinafter, embodiments of the present invention will be described in detail with reference to the attached drawings.

FIG. 1 is a block diagram illustrating a cloud interoperation system according to an embodiment of the present invention.

Referring to FIG. 1, in the cloud interoperation system according to the embodiment of the present invention, an apparatus 100 for checking the status of completion of service control (hereinafter also referred to as a "service control status validating apparatus 100") may communicate with multiple cloud computing systems 10, 20, and 30 and may request the control of a service.

The service control status validating apparatus 100 may first request the control of a service from the computing system 10 by sending a service control message to the computing system 10.

Here, such service control may refer to a request for the creation, stoppage, resumption, or termination of the corresponding service.

The computing system 10 may notify the service control status validating apparatus 100 of acceptance of the request for the service control by sending an acknowledgement (ACK) message to the service control status validating apparatus 100.

The computing system 10 may actually perform the service control requested by the service control status validating apparatus 100.

Here, the service control status validating apparatus 100 may need to check the time at which service control has been completed because it is impossible to guarantee that the service control has been actually completed at the time of notification (ACK).

The service control status validating apparatus 100 may perform service control status checking communication at intervals of a service control status checking period that is generated using probability statistics.

Here, the service control status validating apparatus 100 may change the number of service control completion checks and the service control status checking period depending on the level of the probability of control completion.

Therefore, the service control status validating apparatus 100 may perform service control status checking communication that depends on a large number of control checks and a high frequency at time points at which a high probability of service control completion is predicted, and may perform service control status checking communication that depends on a small number of control checks and a low frequency at time points at which a low probability of service control completion is predicted.

Accordingly, the communication load on the cloud interoperation system and the multiple cloud computing systems interoperably connected thereto according to the embodiment of the present invention may be decreased, and the user response speed and the QoE thereof may be improved.

Further, the service control status validating apparatus 100 may update the status of service control status checking and may notify the user of the updated status.

Figure 2:
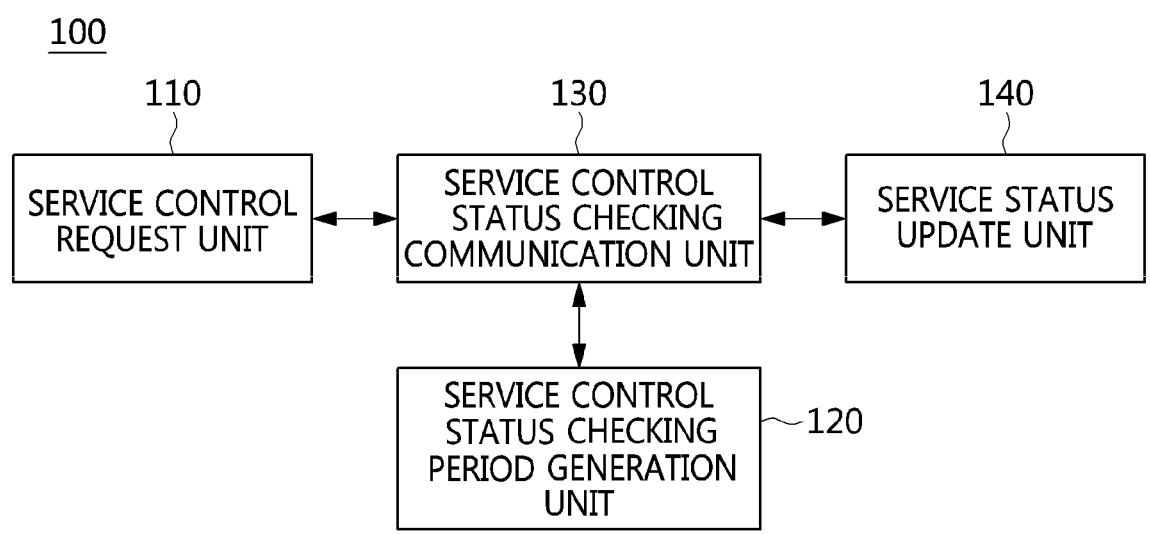
FIG. 2 is a block diagram illustrating an apparatus for checking the status of completion of service control according to an embodiment of the present invention.
Figure 3:
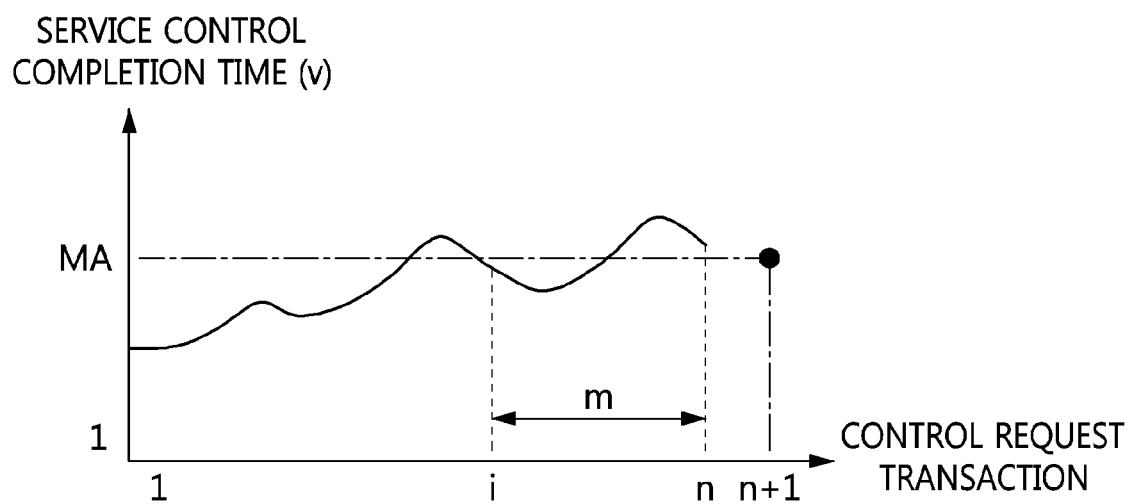
FIG. 3 is a graph illustrating the time of completion of service control corresponding to a control request transaction according to an embodiment of the present invention.
Figure 4:
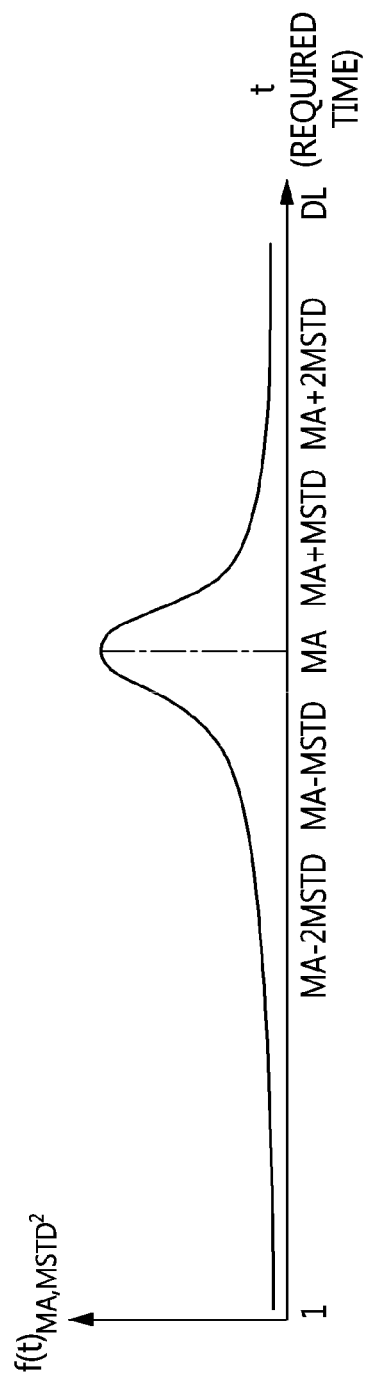
FIG. 4 is a graph illustrating the probability distribution of service control completion times according to an embodiment of the present invention.
Figure 8:
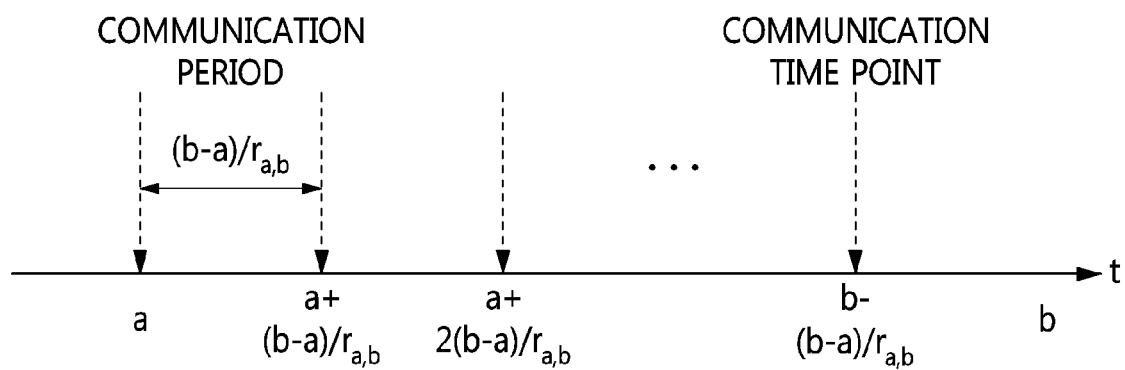
FIG. 8 is a diagram illustrating a communication period and a communication time point required for checking the completion of service control according to an embodiment of the present invention.

FIG. 2 is a block diagram illustrating an apparatus for checking the status of completion of service control according to an embodiment of the present invention. FIG. 3 is a graph illustrating the time of completion of service control corresponding to a control request transaction according to an embodiment of the present invention. FIG. 4 is a graph illustrating the probability distribution of service control completion times according to an embodiment of the present invention. FIG. 5 is a diagram illustrating the period at which the completion of service control is to be checked based on a fixed period according to an embodiment of the present invention. FIGS. 6 and 7 are diagrams illustrating the period at which the completion of service control is to be checked based on probability statistics according to an embodiment of the present invention. FIG. 8 is a diagram illustrating a communication period and a communication time point required for checking the completion of service control according to an embodiment of the present invention.

Referring to FIG. 2, the service control status validating apparatus 100 according to an embodiment of the present invention may include a service control request unit 110, a service control status checking period generation unit 120, a service control status checking communication unit 130, and a service status update unit 140.

The service control request unit 110 may request the control of a service from the computing system 10.

Here, the service control request unit 110 may send a service control request message to the computing system 10 to perform a service control task requested by the user and may receive an acknowledgement (ACK) message sent by the computing system 10 to acknowledge receipt of the request regarding the service control from the service control status validating apparatus.

Here, the service control request unit 110 may initiate service control status validation process after receives an acknowledgement (ACK) for a service control request message.

The service control status checking period generation unit 120 may generate a service control status checking period (i.e. the period at which the completion of service control is to be checked) in order to check the completion of service control.

Here, the service control status checking period generation unit 120 may generate the service control status checking period by predicting a service control completion time (i.e. the time at which service control is to be completed).

The service control status checking period generation unit 120 may predict the service control completion time depending on the type of service using history information.

That is, the service control status checking period generation unit 120 may store history information in which service control completion times depending on control request transactions for respective service types are included.

The history information may be input through statistical data for respective service types depending on the user's settings, and may correspond to information in which past service control completion times are stored for respective service types for which past service control completion status has been checked.

Referring to FIG. 3, it can be seen that the history information is indicated by the graph of service control completion times for control request transactions.

The service control status checking period generation unit 120 may check the service control completion times from the control request transaction history of the history information.

Here, the service control status checking period generation unit 120 may calculate the moving average MA of service control completion times for m control request transaction sections i to n (where m is a natural number of 2 or more) using the history information.

Here, the moving average MA may be represented by the following Equation (1):

$$MA = \frac{1}{m} \cdot \sum_{i=n-m+1}^{n} V_i \quad (1)$$

Further, the service control status checking period generation unit 120 may calculate the moving variance $MSTD^2$ of the service control completion times for the m control request transaction sections i to n (where m is a natural number of 2 or more) using the history information.

Here, the moving variance $MSTD^2$ may be represented by the following Equation (2):

$$MSTD^2 = \frac{1}{m} \cdot \sum_{i=n-m+1}^{n} (MA - V_i)^2 \quad (2)$$

Furthermore, if the type of service for which service control is requested is not present in the history information, the service control status checking period generation unit 120 may predict the service control completion time using the control completion time of a similar service or another service including the corresponding service by referring to the history information. Similarly, the prediction of the service control completion time may be performed by calculating the moving average and the moving variance.

In addition, the service control status checking period generation unit 120 may calculate the probability distribution of the times at which service control is to be completed for respective preset time interval units using the service control completion time.

Referring to FIG. 4, it can be seen that the probability distribution of the service control completion times according to an embodiment of the present invention is shown.

$$N(\mu, \sigma^2) = f(x)_{\mu,\sigma^2} = \frac{1}{\sqrt{2\pi\sigma^2}} e^{-\frac{(x-\mu)^2}{2\sigma^2}} \quad (3)$$

A normal probability distribution $N(\mu,\sigma^2)$ is defined by Equation (3). When the moving average MA is defined as an expected value of the service control completion time and the moving variance $MSTD^2$ is defined as the predicted variance of the service control completion time, a normal probability distribution, which is the distribution of service control completion probabilities for respective times, may be calculated using the following Equation (4):

$$N(MA, MSTD^2) = f(t)_{MA,MSTD^2} = \frac{1}{\sqrt{2\pi \cdot MSTD^2}} e^{-\frac{(t-MA)^2}{2 \cdot MSTD^2}} \quad (4)$$

Further, the service control status checking period generation unit 120 may divide the total verification time required to check the completion of service control into units of preset time intervals, and may generate a service control status checking period using the probability distribution for each time interval unit.

For example, the service control status checking period generation unit 120 may divide the total verification time into preset time interval units p, wherein p may correspond to a time interval unit set by the system or a manager.

Here, when p is 1 minute, and the start time (a) of a time interval is 3 minutes and the end time (b) of the time interval is 4 minutes, a time interval in which t1=a and t2=b may be implemented, where b may be defined as b=a+p.

That is, the time interval [a, b] corresponding to the time interval unit p may be represented by [a, b]=[3, 4], where 4=3+1.

Here, the service control status checking period generation unit 120 may calculate the number of service control completion checks by integrating the probability distribution over each preset time interval.

Here, the service control status checking period generation unit 120 may correct the number of service control completion checks using a preset reference constant so that the number does not exceed the maximum response time of the computing system.

The service control status checking period generation unit 120 may correct the number of service control completion checks using a weight in which the frequency of the checking communication with the computing system is set.

That is, the service control status checking period generation unit 120 may calculate the number of service control completion checks using the following Equation (5):

$$r_{a,b} = \begin{cases} w \cdot k \cdot \int_a^b f(x)dx, & w \cdot k \cdot \int_a^b f(x)dx > 1 \\ 1, & w \cdot k \cdot \int_a^b f(x)dx \leq 1 \end{cases} \quad (5)$$

Here, it can be seen that the probability distribution is represented by $f(x)$, the time interval is represented by a and b, the number of service control completion checks is represented by $r_{a,b}$, the reference constant is represented by k, and the weight is represented by w.

The reference constant k may be defined as a value satisfying the following Equation (6):

$$RTT_{max} \cdot p = \max(k \cdot \int_0^p f(x)dx, k \cdot \int_p^{2p} f(x)dx, \ldots, k \cdot \int_{DL-p-1}^{DL-1} f(x)dx) \quad (6)$$

Equation (6) may be defined such that the maximum r value does not exceed "the maximum response time $RTT_{max}$ of the system*time interval unit p" in any time interval.

For example, assuming that $RTT_{max}$=10/1 minute and p=1 minute and that $\max(k \cdot \int_0^1 f(x)dx, k \cdot \int_1^2 f(x)dx, \ldots, k \cdot \int_{DL-2}^{DL-1} f(x)dx = k \cdot \int_{10}^{11} f(x)dx = k \cdot 0.4$ is satisfied, $RTT_{max} \cdot p = k \cdot \int_{10}^{11} f(x)dx$ may be obtained.

Here, the reference constant k may be calculated as $$k = \frac{RTT_{max} \cdot p}{\int_{10}^{11} f(x)dx} = 10/0.4 = 25.$$

The weight w may be a rational number satisfying 0<w<1. The user may set the weight w depending on the preference of the frequency of checking communication. When the maximum frequency is preferred, 1 may be selected, whereas when the minimum frequency is preferred, a number close to 0 may be selected.

Referring to FIG. 5, it can be seen that a service control completion checking period (hereinafter also referred to as a "service control status checking period") based on a fixed period according to an embodiment of the present invention is shown, and the number of service control completion checks is set to 10 for each time interval unit in a period from first to 25-th time intervals.

Referring to FIGS. 6 and 7, it can be seen that a service control completion checking period based on probability statistics according to an embodiment of the present invention is shown. FIG. 6 shows that, for respective time intervals, time interval units ranging from r1,2 to r19,20 are set.

In FIG. 7, it can be seen that, based on the probability distribution, the number of service control completion checks is set to only 1 in a period from time interval (1) to time interval (17) and is set to 40 for time interval (23), which corresponds to a predicted completion time point, and the numbers of service control completion checks are set to 20, 10, 5, 3, and 2 for time intervals around the time interval (23).

Further, the service control status checking period generation unit 120 may divide a value, obtained by dividing the corresponding preset time interval unit by the number of service control completion checks, as the service control status checking period.

That is, the service control status checking period generation unit 120 may convert the number of service control completion checks for each time interval into a service control status checking period.

For example, when the current time point is t=a, a communication period in interval [a,b] may be defined as $(b-a)/r_{(a,b)}$. Therefore, checking communication in interval [a,b] may be represented by the following Equation (7).

$$t=a, t=a+(b-a)/r_{a,b}, t=a+2(b-a)/r_{a,b}, \ldots, t=b-(b-a)/r_{a,b} \quad (7)$$

Referring to FIG. 8, it can be seen that, for Equation (7), communication time points conforming to the communication period in interval [a,b] are illustrated.

The service control status checking communication unit 130 may perform service control status checking communication with the computing system based on the service control status checking period.

The service status update unit 140 may update the status of the service control.

Here, the service control status checking communication unit 130 may check the status of completion of the service control by sending a service control status checking communication message, required for communication for service control status checking, to the computing system 10.

Here, the service control status checking communication unit 130 may deliver a result indicating success to the service status update unit 140 if the service control has been completed.

The service status update unit 140 may store the status of completion of service control and the time of completion of the service control in the history information of the service control status checking period generation unit 12, and may notify the user of the completion of the service control.

If the service control has not been completed, the service control status checking communication unit 130 may determine whether the total verification time has elapsed.

If the service control has not been completed, and it is determined that the total verification time has not yet elapsed, the service control status checking communication unit 130 may again request the service control status checking period generation unit 120 to generate a service control status checking period.

Here, if the service control has not been completed, and it is determined that the total verification time has elapsed, the service control status checking communication unit 130 may deliver a result indicating a failure to the service status update unit 140.

The service status update unit 140 may store the status of the failure in service control in the history information of the service control status checking period generation unit 120, and may notify the user of the service control failure.

If the service control has been completed, the service status update unit 140 may store the time of completion of service control in the history information.

Figure 9:
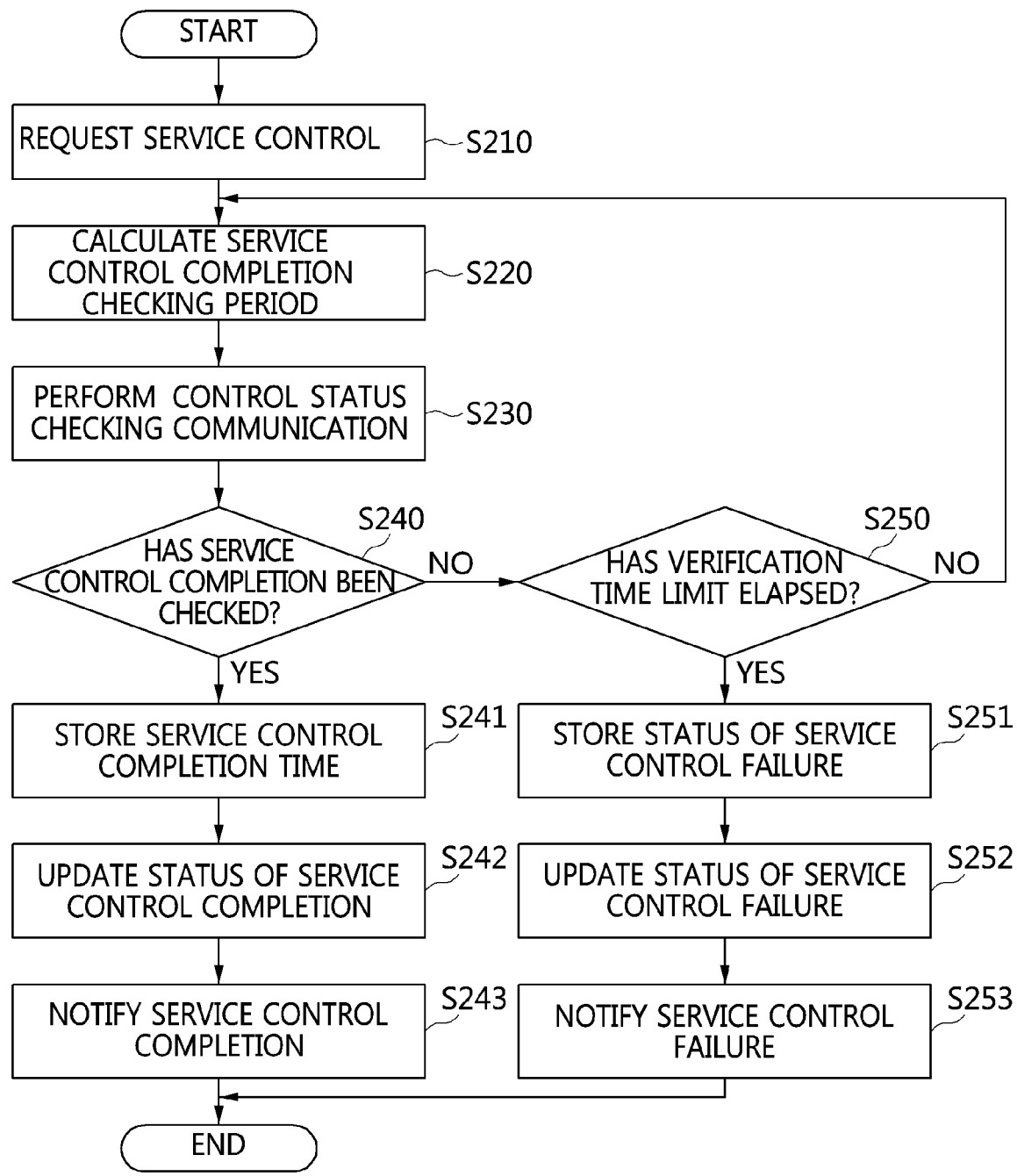
FIG. 9 is an operation flowchart illustrating a method for checking the status of completion of service control according to an embodiment of the present invention.

FIG. 9 is an operation flowchart illustrating a method for checking the status of completion of service control according to an embodiment of the present invention.

Referring to FIG. 9, the method for checking the status of completion of service control according to the embodiment of the present invention may request the control of a service at step S210.

That is, step S210 may be configured to request the control of a service from the computing system 10.

Here, at step S210, a service control request message may be sent to the computing system 10 in order to perform a service control task requested by the user, and an acknowledgement (ACK) response for the acceptance of the service control request message from the computing system 10.

Here, the acknowledgement (ACK) for a service control request message may be a message sent by the computing system 10 to acknowledge receipt of a request regarding a service control from the service control status validating apparatus.

Here, at step S210 may initiate service control status validation process after receives an acknowledgement (ACK) for a service control request message.

Next, the method for checking the status of completion of service control according to the embodiment of the present invention may generate a service control completion checking period at step S220.

Here, step S220 is identical to the method for generating a service control status checking period using the service control status checking period generation unit 120, and thus a detailed description thereof will be omitted.

Further, the method for checking the status of completion of service control according to the embodiment of the present invention may perform service control status checking communication at step S230.

That is, at step S230, service control status checking communication with the computing system may be performed based on the service control status checking period.

Next, the method for checking the status of completion of service control according to the embodiment of the present invention may check whether service control has been completed at step S240.

That is, at step S240, if it is checked that the service control has been completed, the status of completion of service control may be updated at steps S241, S242, and S243, whereas if it is checked that service control has not been completed, whether a verification time limit has elapsed may be determined at step S250.

At step S241, the time of completion of the service control may be stored in the hi story information.

At step S242, the status of completion of the service control may be updated.

At step S243, notification of the service control completion may be provided to the user.

Further, at step S250, if the verification time limit has elapsed, the status of a failure in service control may be updated at steps S251, S252, and S253, whereas if the verification time limit has not yet elapsed, the process returns to step S220, where the generation of a service control completion checking period is requested again.

At step S251, the status of the service control failure may be stored in the history information.

Here, at step S252, the status of the service control failure may be updated.

At step S253, notification of the service control failure may be provided to the user.

Accordingly, the present invention may decrease the communication load on a cloud interoperation system and multiple cloud computing systems interoperably connected thereto and may improve the speed at which service control is checked.

Further, the present invention may improve the user response speed and Quality of Experience (QoE) of a cloud interoperation system and multiple cloud computing systems interoperably connected thereto.

Furthermore, the present invention may predict the accurate time of completion of service control and a precise checking period for completion of service control using a statistical prediction technique.

As described above, in the apparatus and method for checking the status of completion of service control according to the present invention, the configurations and schemes in the above-described embodiments are not limitedly applied, and some or all of the above embodiments can be selectively combined and configured so that various modifications are possible.

Figure 10:
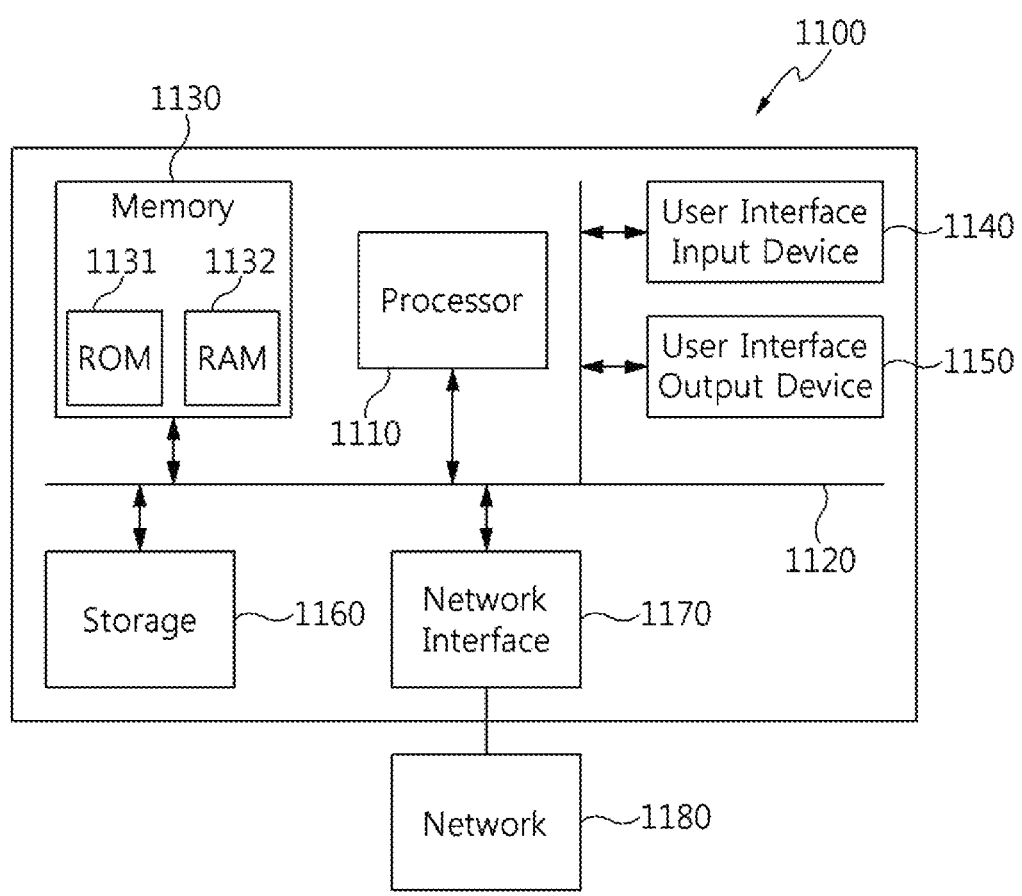
FIG. 10 is a block diagram showing a computer system according to an embodiment of the present invention.

FIG. 10 is a block diagram showing a computer system according to an embodiment of the present invention.

Referring to FIG. 10, the embodiment of the present invention may be implemented in a computer system 1100 such as a computer-readable storage medium. As shown in FIG. 10, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each of the processors 1110 may be a central processing unit (CPU) or a semiconductor device for executing processing instructions stored in the memory 1130 or the storage 1160. Each of the memory 1130 and the storage 1160 may be a volatile or nonvolatile storage medium. For example, the memory 1130 may include Read Only Memory (ROM) 1131 or Random Access Memory (RAM) 1132.

What is claimed is:

1. An apparatus for validating service control status, comprising:
    a service control request unit for requesting performance of a control operation of a service from a computing system;
    a service control status checking period generation unit for generating a service control status checking period in order to check completion of the control operation of the service; and
    a service control status checking communication unit for determining whether the control operation of the service has completed by performing service control status checking communication with the computing system based on the service control status checking period,
    wherein the service control status checking period generation unit predicts a service control completion time of the service using a completion time of a previous service control request corresponding to the service stored in history information, calculates a probability distribution of the service control completion time for each of preset time interval units using the service control completion time, generates the service control status checking period using the probability distribution, sets the number of service control completion checks for each of the preset time interval units based on the probability distribution, and converts the number of the service control completion checks for each of the preset time interval units into the service control status checking period.

2. The apparatus of claim 1, further comprising a service status update unit for updating, according to a result of the service control status checking communication, a status of the control operation of the service.

3. The apparatus of claim 2, wherein the service control status checking period generation unit stores the history information in which respective service control completion times depending on control request transactions for a plurality of service types are included.

4. The apparatus of claim 3, wherein the service control status checking period generation unit predicts the service control completion time of the control operation of the service using the history information of a service type corresponding to the service.

5. The apparatus of claim 4, wherein the service control status checking period generation unit predicts the service control completion time of the control operation of the service by calculating, using the history information, a moving average and a moving variance of service control completion times for a control request transaction section including a plurality of past control request transactions.

6. The apparatus of claim 5, wherein the service control status checking period generation unit calculates the probability distribution of the service control completion time of the control operation of the service from a normal probability distribution obtained by defining the moving average as an expected value of the normal probability distribution and defining the moving variance as a variance of the normal probability distribution.

7. The apparatus of claim 6, wherein the service control status checking period generation unit divides a total verification time required to check completion of the control operation of the service into the preset time interval units, and generates the service control status checking period using the probability distribution for each of the preset time interval units.

8. The apparatus of claim 7, wherein the service control status checking period generation unit calculates the number of the service control completion checks by integrating the probability distribution for each of the preset time interval units.

9. The apparatus of claim 8, wherein the service control status checking period generation unit corrects the number of the service control completion checks using a preset reference constant such that the number does not exceed a maximum response time of the computing system.

10. The apparatus of claim 9, wherein the service control status checking period generation unit corrects the number of the service control completion checks using a weight in which a frequency of checking communication with the computing system is set.

11. The apparatus of claim 10, wherein the service control status checking period generation unit calculates a value, obtained by dividing the corresponding preset time interval units by the number of the service control completion checks, as the service control status checking period.

12. A method for validating service control status, comprising:
    requesting performance of a control operation of a service from a computing system;
    generating a service control status checking period in order to check completion of the control operation of the service; and
    determining whether the control operation of the service has completed by performing service control status checking communication with the computing system based on the service control status checking period,
    wherein generating the service control status checking period includes predicting a service control completion time of the service using a completion time of a previous service control request corresponding to the service stored in history information, calculating a probability distribution of the service control completion time for each of preset time interval units using the service control completion time, generating the service control status checking period using the probability distribution, setting the number of service control completion checks for each of the preset time interval units based on the probability distribution, and converting the number of the service control completion checks for each of the preset time interval units into the service control status checking period.

13. The method of claim 12, further comprising predicting, using the history information, the service control completion time depending on a service type of the service, the history information including respective service control completion times for control request transactions for a plurality of service types.

14. The method of claim 13, further comprising generating the service control status checking period by calculating, using the history information, a moving average and a moving variance of service control completion times for a control request transaction section including a plurality of past control request transactions.

15. The method of claim 14, further comprising generating the service control status checking period by calculating the probability distribution of the service control completion times for the control request transaction section from a normal probability distribution obtained by defining the moving average as an expected value of the normal probability distribution and defining the moving variance as a variance of the normal probability distribution.

16. The method of claim 15, further comprising generating the service control status checking period by dividing a total verification time required to check completion of the service control into the preset time interval units, and generating the service control status checking period using the probability distribution for each of the preset time interval units.

17. The method of claim 16, further comprising generating the service control status checking period by calculating the number of the service control completion checks by integrating the probability distribution for each of the preset time interval units.

18. The method of claim 17, further comprising generating the service control status checking period by calculating a value, obtained by dividing the corresponding preset time interval units by the number of the service control completion checks, as the service control status checking period.

19. An apparatus for validating service control status, comprising:
   a service control request unit for requesting for a control action of a cloud service to one or more cloud computing system;
   a status checking period generation unit for generating a cloud service control status checking period in order to validate a status of the cloud service whether the status is changed correctly or not in accordance with the requesting for the control action by predicting completion time of the control action to reduce communication overhead; and
   a communication unit for performing cloud service control status checking communication with the one or more cloud computing system based on the cloud service control status checking period,
   wherein the status checking period generation unit predicts a cloud service control completion time of the cloud service using a completion time of a previous cloud service control request corresponding to the cloud service stored in history information, calculates a probability distribution of the cloud service control completion time for each of preset time interval units using the cloud service control completion time, generates the cloud service control status checking period using the probability distribution, sets the number of cloud service control completion checks for each of the preset time interval units based on the probability distribution, and convert the number of the cloud service control completion checks for each of the preset time interval units into the cloud service control status checking period.

20. A method for validating service control status, comprising:
   requesting for a control action of a cloud service to one or more cloud computing system;
   generating a cloud service control status checking period in order to validate a status of the cloud service whether the status is changed correctly or not in accordance with the requesting for the control action by predicting completion time of the control action to reduce communication overhead; and
   performing cloud service control status checking communication with the one or more computing system based on the cloud service control status checking period,
   wherein generating the cloud service control status checking period includes predicting a cloud service control completion time of the cloud service using a completion time of a previous cloud service control request corresponding to the cloud service stored in history information, calculating a probability distribution of the cloud service control completion time for each of preset time interval units using the cloud service control completion time, generating the cloud service control status checking period using the probability distribution, setting the number of cloud service control completion checks for each of the preset time interval units based on the probability distribution, and converting the number of the cloud service control completion checks for each of the preset time interval units into the cloud service control status checking period.

* * * * *